US006751081B1

(12) United States Patent
Kooiman

(10) Patent No.: US 6,751,081 B1
(45) Date of Patent: Jun. 15, 2004

(54) SURGE PROTECTED COAXIAL TERMINATION

(75) Inventor: John A. Kooiman, Peoria, AZ (US)

(73) Assignee: Corning Gilbert Inc., Glendale, AZ (US)

( * ) Notice: Subject to any disclaimer, the term of this patent is extended or adjusted under 35 U.S.C. 154(b) by 446 days.

(21) Appl. No.: 09/712,433

(22) Filed: Nov. 14, 2000

(51) Int. Cl.[7] .................................................. H02H 9/00
(52) U.S. Cl. ........................ 361/119; 361/120; 361/127
(58) Field of Search ........................... 361/56, 111, 118, 361/127, 120, 113, 119

(56) References Cited

U.S. PATENT DOCUMENTS

| | | | | |
|---|---|---|---|---|
| 5,508,873 A | | 4/1996 | Knapp et al. | 361/119 |
| 5,724,220 A | * | 3/1998 | Chaudhry | 361/119 |
| 5,790,361 A | | 8/1998 | Minich | 361/111 |

* cited by examiner

*Primary Examiner*—Stephen W. Jackson
(74) *Attorney, Agent, or Firm*—Cahill, von Hellens & Glazer P.L.C.

(57) ABSTRACT

A surge-protected coaxial termination includes a metallic outer body, a center conductor extending through a central bore of the outer body, and a spark gap created therebetween to discharge high-voltage power surges. A pair of dielectric support insulators support the center conductor on opposite sides of the spark gap. High impedance inductive zones surround the spark gap to form a T-network low pass filter that nullifies the additional capacitance of the spark gap. An axial, carbon composition resistor is disposed inside the outer body, and inside the dielectric insulator to absorb the RF signal, and prevent its reflection. The resistor extends co-axially with the center conductor, and one end of the resistor is electrically coupled thereto. A blocking chip capacitor extends radially from the opposite end of the resistor to the grounded outer body. The opposing second end of the resistive component may protrude from the metallic outer body and related dielectric material; the DC blocking capacitor preferably extends radially between the second end of the resistive component and the metallic outer body, or to a grounding post secured thereto.

41 Claims, 3 Drawing Sheets

SURGE PROTECTED COAXIAL TERMINATION

BACKGROUND OF THE INVENTION

1. Field of the Invention

The present invention relates generally to coaxial terminations used to terminate ports that are adapted to receive coaxial cable connectors, and more particularly, to an improved coaxial termination that offers protection against high-voltage surges.

2. Description of the Related Art

RF coaxial cable systems are well known to those in the cable television industry for distributing radio frequency signals to subscribers of cable television service, and more recently, voice and data telecommunications services. The coaxial cables used to route such signals include a center conductor for transmitting a radio frequency signal, and a surrounding, grounded outer conductive braid or sheath. Typically, the coaxial cable includes a dielectric material surrounding the center conductor and spacing it from the grounded outer sheath. The diameter of the center conductor, and the diameter of the outer conductor, and type of dielectric are selected to produce a characteristic impedance, such as 75 ohms, in the coaxial line. This same coaxial cable is sometimes used to provide AC power (typically 60–90 Vrms) to the equipment boxes that require external power to function. Approximately 80% of the cable in a system will carry this AC power.

Within such coaxial cable systems, such coaxial lines are typically coupled at their ends to equipment boxes, such as signal splitters, amplifiers, etc. These equipment boxes often have several internally-threaded coaxial ports adapted to receive end connectors of coaxial cables. If one or more of such coaxial ports is to be left "open", i.e., a coaxial cable is not going to be secured to such port, then it is necessary to "terminate" such port with a coaxial termination that matches the characteristic impedance of the coaxial line (e.g., a 75 ohm termination). If such a coaxial termination is omitted, then undesired reflected signals interfere with the proper transmission of the desired radio frequency signal.

Coaxial terminations of the type described above are known and available. Typically, such known coaxial termination devices include a metallic outer body which, at a first end thereof, is provided with external threads for mating with the internal threads of a coaxial port on the equipment box. A center conductor passes through a dielectric secured within the metallic outer body from the first end of the coaxial termination device to an opposing second end thereof. At the second end of the coaxial termination device, a resistor corresponding to the characteristic impedance of the coaxial line is secured, and is coupled between the center conductor and the grounded metallic outer body. If the coaxial line carries AC or DC power, then a low frequency blocking capacitor is typically used to couple the aforementioned resistor to ground. The resistor and capacitor of such known coaxial termination devices are often located outside the controlled characteristic impedance environment, creating an impedance mismatch that reflects some of the forward-transmitted signal back toward its source. These reflections can result in loss of power transfer and interference with, or corruption of, the signal. Accordingly, some signal degradation results from the use of such coaxial termination devices. The degree of such signal degradation at a given frequency, resulting from such impedance mismatch, is sometimes expressed as the RF return loss performance of the coaxial system.

Moreover, when deployed in the field, as in cable TV systems, for example, these known coaxial termination devices can be subjected to power surges caused by lightening strikes and other events. These power surges can damage or destroy the resistive and/or capacitive elements in such a termination, rendering it non-functional. A commonly used surge test, ANSI C62.41 Category B3, specifies that a 6,000 Volt open circuit/3,000 Amp short circuit surge pulse be injected into the coaxial termination device. At least some of the known coaxial termination devices have difficulty complying with such surge test. Indeed, efforts to make the resistive and capacitive components larger, in order to withstand such power surges, can have the negative impacts of increased costs and/or creating a larger impedance mismatch, and hence, causing poorer levels of RF Return Loss performance. One approach to designing a termination that can withstand the previously mentioned 6,000 Volt surges would be to use a 6,000 Volt capacitor and a high power resistor. Unfortunately, such components are relatively expensive and have a much larger physical size, which tends to increase the size and cost of the housing necessary to contain such components, thereby resulting in a much bulkier and more costly design.

Accordingly, it is an object of the present invention to provide a coaxial termination device capable of maintaining high levels of RF Return Loss performance.

It is a further object of the present invention to provide such a coaxial termination device capable of withstanding power surges without damage to the resistive and/or capacitive elements thereof.

A further object of the present invention is to provide such a coaxial termination device that can simultaneously withstand such power surges without damage, while still maintaining high levels of RF Return Loss performance.

A still further object of the present invention is to provide such a termination device that is relatively compact and inexpensive to manufacture.

Another object of the present invention is to provide such a coaxial termination device that reduces reflection by disposing the resistive component thereof in a controlled characteristic impedance environment.

Still another object of the present invention is to minimize the length of the path between the resistive component of the coaxial termination device and ground (i.e., through the capacitive component) to further minimize inductance and signal reflection.

Yet another object of the present invention is to provide such a coaxial termination device which allows the resistive and capacitive components thereof to be relatively small in size to maintain high levels of RF Return Loss performance while still being able to withstand power surges without damage.

These and other objects of the present invention will become more apparent to those skilled in the art as the description of the present invention proceeds.

SUMMARY OF THE INVENTION

Briefly described, and in accordance with the preferred embodiments thereof, the present invention relates to a surge-protected coaxial termination that includes a metallic outer body having a central bore extending therethrough, a center conductor extending into the central bore of the metallic outer body, and a spark gap created within such coaxial termination for allowing a high-voltage power surge to discharge across the spark gap without damaging other components (e.g., resistive and/or capacitive components) that might also be included in such coaxial termination. The central bore of the outer body is bounded by an inner wall, and the center conductor has an outer diameter facing the inner wall of the outer body. Normally, there is a solid dielectric material separating the outer diameter of the center conductor from the inner wall of the outer body; however, in the vicinity of the aforementioned spark gap, the dielectric material is simply air or another ionizable gas.

In a first embodiment of the present invention, the spark gap is created by including an inwardly-directed step upon the inner wall of the outer body. This inwardly-directed step portion of the inner wall is of relatively short axial length and has an inner diameter that is significantly smaller than the inner diameter of the remainder of such inner wall of the outer body. The center conductor extends through the inwardly directed step of the inner wall; at the point where the center conductor passes through the inwardly-directed step, its outer diameter is slightly less than the inner diameter of the inwardly-directed step. This positions the inwardly-directed step of the inner wall in close proximity to the center conductor to form the spark gap therebetween. If desired, the outer diameter of the center conductor can be enlarged somewhat to form an outwardly-directed step at the point where it passes through the inwardly-directed step to facilitate the passage of a spark between the outwardly-directed step of the center conductor and the inwardly-directed step of the outer body.

In a second embodiment of the present invention, the surge-protected coaxial termination again includes a metallic outer body having a central bore extending therethrough, and a center conductor extending into the central bore thereof, but the spark gap is created by forming an outwardly-directed step of relatively short axial length on the center conductor extending toward the inner wall of the outer body. The outer diameter of the outwardly-directed step is slightly less than the inner diameter of the inner wall for positioning the outwardly-directed step of the center conductor in close proximity to the inner wall of the outer body to form a spark gap therebetween.

In a third embodiment of the present invention, the surge-protected coaxial termination again includes a metallic outer body having a central bore extending therethrough, and a center conductor extending into the central bore thereof, but the spark gap is created by a lateral conductor, such as a post or the like. This lateral conductor can be secured to the outer body and extend laterally toward the center conductor, or the lateral conductor can be secured to the center conductor and extend laterally toward the inner wall of the outer metallic body. In either case, the lateral conductor creates a spark gap that can discharge to ground any high voltage surges that appear between the center conductor and the outer conductor.

The creation of the spark gap in the manner described above tends to present a highly-capacitive discontinuity to any RF fields traveling along the transmission line; such a capacitive discontinuity would ordinarily cause reflections of the type that a coaxial termination device is designed to prevent. Accordingly, in the preferred form of the present invention, at least one relatively high characteristic impedance inductive zone is formed adjacent the capacitive spark gap; preferably, such high characteristic impedance inductive zones are formed on both sides of the spark gap. The combination of the capacitive spark gap and the high impedance inductive zones form the equivalent of an electrical T-network low pass filter, wherein the additional inductance of the high impedance zones effectively nullifies the additional capacitance of the spark gap, over the bandwidth of interest.

As mentioned above, coaxial termination devices typically include a resistive component to absorb the RF signal, and prevent the reflection of the RF signal. Accordingly, the preferred embodiments of the present invention include a resistive terminating element electrically coupled between the center conductor and the metallic outer body. This resistor is electrically in parallel with the spark gap, whereby surge currents that jump the spark gap flow around the resistor, avoiding damage thereto. Accordingly, the resistor can be relatively compact and inexpensive.

As also mentioned above, coaxial termination devices typically include an AC/DC power blocking capacitor coupled in series with the resistor between the center conductor and the metallic outer body. Once again, the capacitor can be relatively small and inexpensive because the spark gap protects the capacitor from damaging high voltage power surges.

Another novel feature of the preferred form of the present invention relates to the manner by which such resistive and capacitive components of the coaxial termination device are incorporated therein. Preferably, the resistive component is disposed inside the metallic outer body, and extends co-axially with the center conductor. Ideally, this resistive component is formed inexpensively as a carbon composition resistor. The resistive component may be surrounded by, and supported by, dielectric material disposed inside the central bore of the metallic outer body, thereby maintaining the resistor in a controlled characteristic impedance environment. One end (electrode) of the resistive component is electrically coupled with an end of the center conductor. The opposing second end (electrode) of the resistive component may protrude from the metallic outer body and related dielectric material; the DC blocking capacitor preferably extends radially between the second end of the resistive component and the metallic outer body, or to a grounding post secured thereto. Since the DC blocking capacitor is surge-protected, it may be of a compact and inexpensive design, such as a chip capacitor.

Another aspect of the present invention relates to such a device that is used to couple together two coaxial transmission devices, rather than to terminate a transmission path, while retaining the advantages of providing surge protection. This coupling device uses a similar outer body, center conductor, and spark gap as the aforementioned termination device; in the preferred form of the surge-protected coupler, relatively high characteristic impedance inductive zones are formed adjacent the capacitive spark gap on opposing sides thereof.

DETAILED DESCRIPTION OF THE PREFERRED EMBODIMENT

Figure 1:
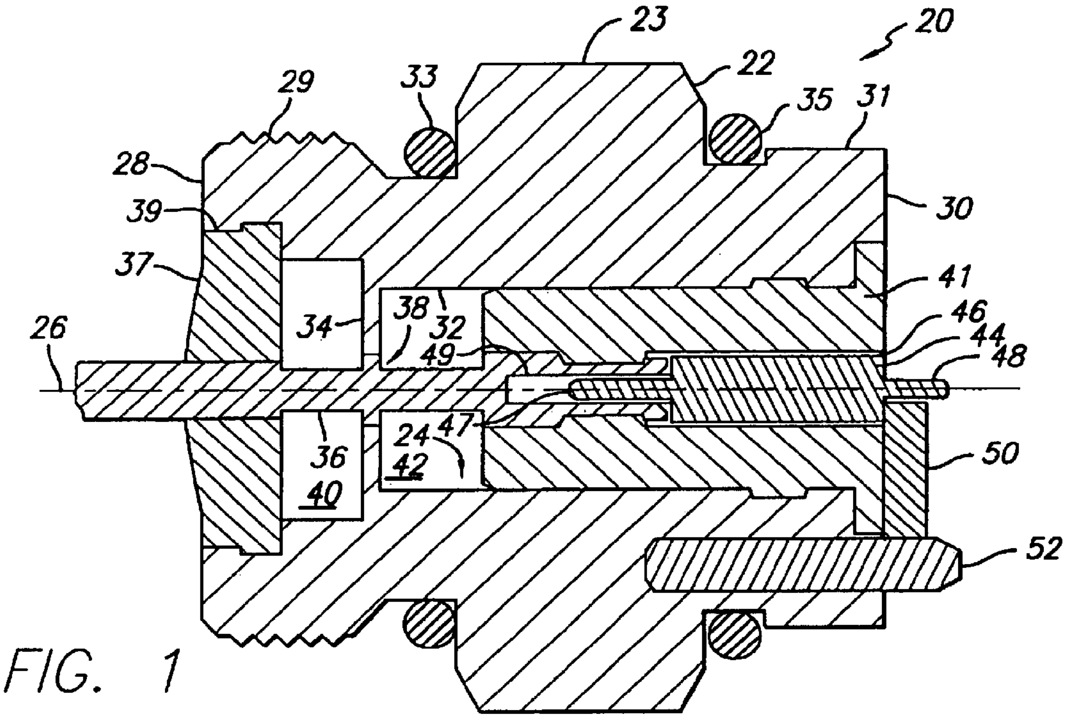
FIG. 1 is a cross-sectional view of a surge-protected coaxial termination for terminating a coaxial port of an equipment box.
Figure 2:
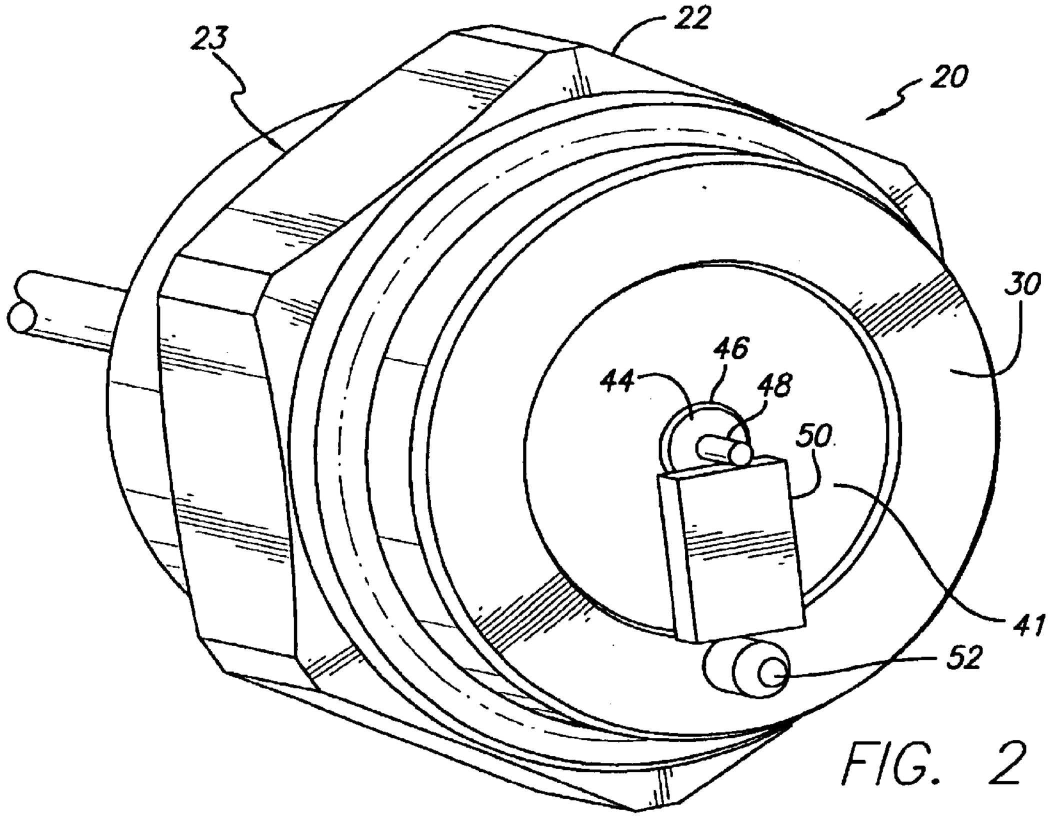
FIG. 2 is a perspective view of the surge-protected coaxial termination shown in FIG. 1 and showing a chip-type blocking capacitor mounted between the center conductor post and the metallic outer body.

A surge-protected coaxial termination constructed in accordance with a preferred embodiment of the present invention is shown in FIGS. 1 and 2 and is identified generally therein by reference numeral 20. Coaxial termination device 20 includes a metallic outer body 22 incorporating a hex-shaped outer profile 23 for receiving the jaws of a wrench when coaxial termination device 20 is tightened onto a coaxial port of a transmission line equipment box. Metallic outer body 22 has a central bore 24, or central passage, extending therethrough along a longitudinal axis 26 between a first end 28 and a second end 30 of metallic outer body 22. Central bore 24 is bounded by an inner wall 32. As shown in FIG. 1, an inwardly-directed, radial step 34 extends from inner wall 32 toward central axis 26. This step 34 is relatively short in the sense that its length along central axis 26 is very short by comparison with the axial length of the remaining portion of inner wall 32. Likewise, the inner diameter of inner wall 32 within step portion 34 is significantly smaller than the inner diameter of the remaining portion of inner wall 32.

As shown in FIG. 1, first end 28 of outer body 22 includes external mounting threads 29 which may be used to secure coaxial termination device 20 to an unterminated coaxial port of a transmission line equipment box. Opposing end 30 of outer body 22 includes a smooth outer cylindrical surface 31 to form a press fit for mating with a protective cap (see FIG. 3). If desired, outer cylindrical surface 31 can be formed with external threads for mating with internal threads (not shown) of such a protective cap. A pair of O-rings 33 and 35 are secured over outer body 22; the function performed by O-rings 33 and 35 is described below in conjunction with FIG. 3.

A center conductor 36 extends through central bore 24 of outer body 22, including the reduced-diameter step portion 34 of inner wall 32. Center conductor 36 is supported at one end thereof within central bore 24 by a first supporting insulator 37 of dielectric material; supporting insulator 37 is, in turn, supported by an enlarged annular bore 39 formed in first end 28 of outer body 22. The portion of center conductor 36 that protrudes outwardly from first end 28 of outer body 22 can be cut to any desired length by a user. A typical coaxial port of an equipment box includes a clamping mechanism (not shown) for clamping center conductor 36 and establishing an electrical connection therewith.

Center conductor 36 is also supported at its opposite end by a second supporting insulator 41 of dielectric material, which fits into central bore 24 from second end 30 thereof. The outer diameter of center conductor 36 is preferably selected so that, at any point along its length, given the surrounding dielectric characteristics, and given the diameter of the surrounding inner wall, the characteristic impedance of center conductor 36 will be matched with the desired characteristic impedance of the coaxial cable system (e.g., 75 ohms in a 75-ohm characteristic impedance system). The major exception to the foregoing statement is at the location where center conductor 36 passes through the radial step portion 34 of inner wall 32. Within radial step portion 34 of inner wall 32, the outer diameter of center conductor 36 is preferably equal to, or slightly greater than, the outer diameter of center conductor 36 on either side axially of radial step portion 34. In any event, the outer diameter of center conductor 36 within radial step portion 34 of inner wall 32 is slightly less than the inner diameter of radial step portion 34 for positioning radial step portion 34 of inner wall 32 in close proximity to center conductor 36 to form a narrow spark gap 38 therebetween.

Figure 4:
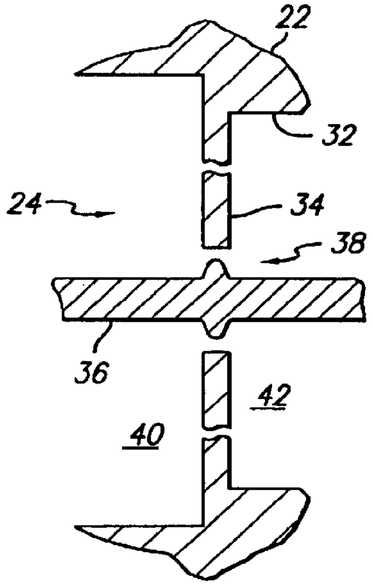
FIG. 4 is an enlarged, partial cross-sectional view of the spark gap between the center conductor and the surrounding outer metallic body for the embodiment of the surge-protected coaxial termination shown in FIG. 1.

Spark gap 38 is shown in greater detail in the enlarged drawing of FIG. 4. As indicated in FIG. 4, center conductor 36 preferably includes a slightly enlarged diameter within radial step portion 34 of inner wall 32 to facilitate the jumping of a spark across spark gap 38. The dimensions of spark gap 38 are selected to effectively insulate grounded radial step 34 from center conductor 36 at normal operating voltages and currents, up to a certain threshold voltage (for example, 1500 Volts). When the surge voltage between center conductor 36 and outer body 22 exceeds this threshold voltage, spark gap 38 will fire and conduct any excess energy to ground. Such an abnormal power surge might be induced by a lightning strike, for example.

Radial step 34, and spark gap 38, being in close proximity to center conductor 36, represent a highly-capacitive discontinuity in the characteristic impedance of the transmission line relative to RF fields traveling therealong, and would normally cause the RF energy to be reflected, contrary to the purpose of the coaxial termination device. Accordingly, high characteristic impedance inductive zones 40 and 42 are preferably formed on both sides of reduced-diameter radial step 34 to create the equivalent of an electrical T-network low pass filter. High impedance zones 40 and 42 lie on opposite sides of radial step portion 34. The amount of additional inductance introduced by high impedance inductive zones 40 and 42 is designed to precisely offset the additional capacitance caused by reduced-diameter step portion 34. The combined effect of such high impedance inductive zones 40 and 42, together with the highly-capacitive radial step portion 34, effectively nullifies the RF signal reflection that would otherwise occur due to radial step 34 alone. The low pass filter formed by radial step 34 and inductive zones 40 and 42 allows termination device 20 to offer state of the art Return Loss performance over the bandwidth of interest (e.g., 5–1000 MHZ).

As mentioned above, a coaxial termination device typically includes a resistive terminating element coupled between center conductor 36 and grounded outer body 22. Referring to FIG. 1, axial resistor 44 is preferably of the carbon composition type, and is disposed within central bore 24 of outer body 22. More specifically, resistor 44 is supported within a central bore 46 of supporting insulator 41; a first internal electrode 47 of resistor 44 is received within a bore 49 formed in the end of center conductor 36 that lies within supporting insulator 41; electrode 47 may be soldered to center conductor 36 before center conductor 36 and resistor 44 are inserted into supporting insulator 41. At the opposite end of resistor 44, an external solder electrode 48 protrudes from the outer face of supporting insulator 41. The value for resistor 44 is chosen to be compatible with the characteristic impedance of the coaxial line (e.g., 50 ohms, 75 ohms, etc.). Resistor 44 is the element that absorbs the RF signal to prevent reflection. Resistor 44 is preferably chosen to be a carbon composition resistor because such resistors offer good high frequency performance, and also have the ability to withstand the surge current that occurs as the capacitor is alternately charged, and then discharged, during surge protection. As mentioned above, any deviation from the characteristic impedance of the coaxial line can cause RF signal reflection; accordingly, resistor 44 is strategically placed on the central axis of the coaxial line structure, and surrounding supporting insulator 41, and central bore 24 of outer body 22, are designed to maintain the desired characteristic impedance throughout the length of resistor 44.

A blocking capacitor 50, in the form of a so-called "chip capacitor", extends radially between solder electrode 48 and a second solder electrode 52, or grounding post, that extends from a recess formed in outer body 22. The opposing ends (electrodes) of blocking capacitor 50 are soldered to electrodes 48 and 52 in order to electrically couple center conductor 36 in series with resistor 44 and capacitor 50 to ground (outer body 22), in parallel with spark gap 38. Capacitor 50 is provided to block DC or AC power from flowing through resistor 44 and is not required if AC or DC power is not present on the line; in that case, resistor 44 is connected directly to ground. Chip capacitor 50 is strategically placed to terminate resistor 44 with the shortest possible path to ground, thereby minimizing any parasitic inductance in the connection between resistor 44 and ground.

Since the spark gap 38 is effectively in parallel with resistor 44 and capacitor 50, any power surges are coupled to ground across spark gap 38 to avoid damage to resistor 44 or capacitor 50. In addition, as described above, spark gap 38 and high impedance inductive zones 40 and 42 form a low pass filter that has the additional benefit of reflecting any high-frequency surge energy occurring above, for example, 1000 MHZ, thereby offering additional protection to resistor 44 and capacitor 50.

Figure 3:
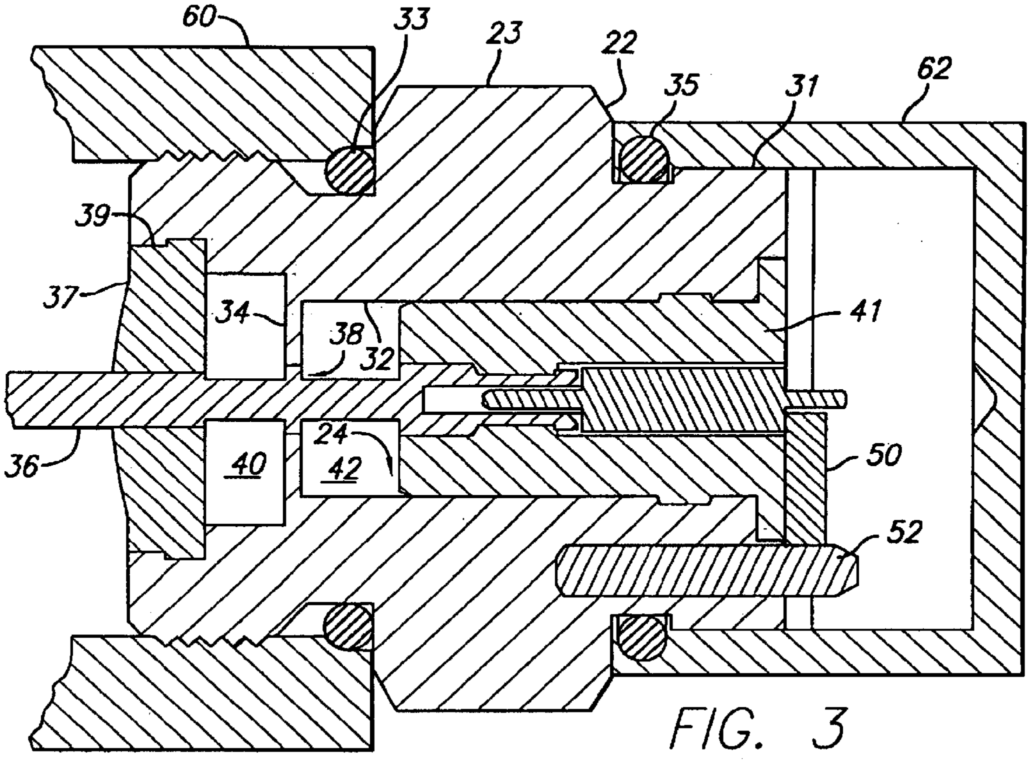
FIG. 3 is a cross-sectional view of the surge-protected coaxial termination of FIGS. 1 and 2 after being mounted within a coaxial port of an equipment box and including a protective end cap.

As shown in FIG. 3, coaxial termination device 20 is adapted to be threadedly engaged with coaxial port 60 of a transmission line equipment box. O-ring 33 forms a fluid-tight seal between outer body 22 and coaxial port 60 to seal out moisture. The opposing end of outer body 22 is protected by a sealing cap 62, which includes a smooth inner cylindrical bore that engages smooth outer bore 31 (see FIG. 1) of outer body 22 to form a press-fit connection. O-ring 35 forms a fluid-tight seal between outer body 22 and sealing cap 62 to seal out moisture.

Figure 5:
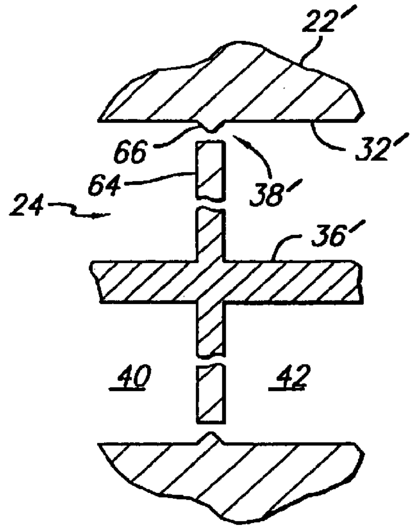
FIG. 5 is an enlarged cross-sectional view of the spark gap between the center conductor and the surrounding outer metallic body for an alternate embodiment of the surge-protected coaxial termination drive.

FIG. 5 serves to illustrate an alternate embodiment of the invention. Those components within FIG. 5 that are analogous to components shown in FIG. 4 are identified by like primed reference numerals. In the arrangement of FIG. 5, the large inwardly-directed radial step 34 of FIG. 4 is omitted, and an outwardly-directed radial step 64 is instead formed upon center conductor 36'. The spark gap 38' is now formed closer to inner wall 32' of central bore 24. If desired, a small inwardly-directed step 66 can be formed on the inner wall 32' of outer body 22' opposite radial step 64 to facilitate the passage of a spark across spark gap 38'.

Those skilled in the art will now appreciate that an improved surge-protected coaxial termination device has been described which offers many advantages over known coaxial terminators. As mentioned above, tests conducted by applicant indicate a demonstrated performance of 45 dB Return Loss to 1 GHz, which is about 15 dB better than the current industry state of the art. The disclosed surge protection spark gap allows the present termination device to withstand the 6000 Volt open circuit/3000 Amp short circuit surge test of ANSI C62.41 Category B3, without damage, while still maintaining high levels of RF Return Loss performance. The present invention allows the use of smaller, less expensive, lower voltage, and lower power components that result in a smaller and more economical design. By axially disposing the termination resistor inside the outer metallic body of the termination device, and within the solid dielectric material, the termination device is more compact, and the resistor is maintained within a controlled 75 ohm characteristic impedance environment, for improved return loss performance. There is also a shorter path between the blocking capacitor and ground, thereby resulting in less inductance. Since the spark gap protects the resistor and blocking capacitor from damage due to surges, the resistor and capacitor can be smaller and less expensive.

In addition, while the foregoing description refers to the disclosed device as a coaxial termination, the benefits of the present invention can also be applied to a coupling device used to couple together two coaxial transmission devices. For example, such a coupling device could be used to couple the end of a coaxial cable to a coaxial port of an equipment box; alternatively, such a coupling device could be used to couple together the ends of two coaxial cables. Such a coupling device omits the above-described resistor and blocking capacitor, but retains the spark gap between the center conductor and the outer metallic body. An example of such a coupling device is shown (conceptually) in FIG. 6.

Figure 6:
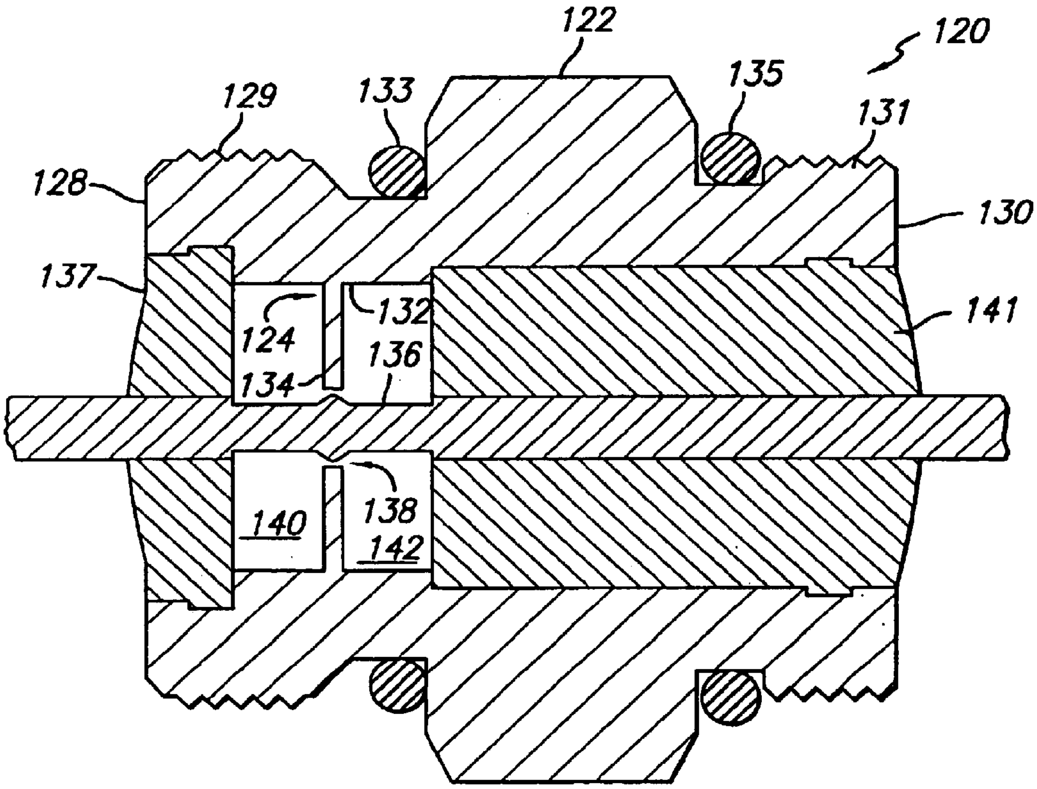
FIG. 6 is a cross-sectional view of a surge-protected coupler together two coaxial transmission devices.

Within FIG. 6, surge-protected coupler 120 includes metallic outer body 122 having central bore 124 defined by inner wall 132 and extending through metallic outer body 122 between its opposing ends 128 and 130. Center conductor 136 extends through central bore 124 of metallic outer body 122 and is supported therein by dielectric material 137 and 141 in a manner similar to that described above in regard to termination device 20, thereby maintaining a desired characteristic impedance of the transmission line. As in the case of termination device 20, coupler 120 forms a spark gap 138 by forming a thin, inwardly-directed radial step 134 on inner wall 132; the innermost surface of radial step 134 has a diameter slightly greater than that of center conductor 136 in such vicinity for positioning radial step 134 in close proximity to center conductor 136 to form spark gap 138 therebetween. As in the case of termination device 20, coupler 120 includes first and second zones 140 and 142, respectively, of relatively high impedance on opposing sides of spark gap 138. As in the case of termination device 20, center conductor 136 may include a slightly enlarged diameter at the location of the spark gap 138 to facilitate the transmission of a spark across spark gap 138. Also as in the case of termination device 20, inner bore 124 could be smooth, without inwardly-directed radial step 134, and an outwardly-directed radial step could instead be formed upon center conductor 136 extending proximate to inner wall 132 to form spark gap 138 (see FIG. 5).

First end 128 of coupler 120 in FIG. 6 has external threads 129 for use in securing first end 128 to a coaxial port of an equipment box, to a female-threaded coaxial cable end connector, or to some other coaxial transmission device. O-ring 133 aids in forming a moisture-proof connection of first end 128 with the coaxial transmission device secured thereto. Likewise, external threads 131 are formed on second end 130 of coupler 120 for use in securing second end 130 to a female-threaded coaxial cable end connector, or to some other coaxial transmission device. If desired, second end 130 could instead be formned as a female, internally-threaded fitting for mating with an externally-threaded male fitting. O-ring 135 again aids in forming a moisture-proof connection between second end 130 of coupler 120 and the coaxial transmission device secured thereto.

The disclosed termination device described in conjunction with FIGS. 1–5, and the alternate form of coupling device shown in FIG. 6, can be used with both hardline cable or flex coax cable. Moreover, the disclosed surge protection feature can also be incorporated within conventional drop cable F-connectors. Furthermore, while the spark gap 38 described above as being formed by an extension, or step, of either the inner wall 32 of outer body 22, or center conductor 36, those skilled in the art will appreciate that the spark gap could also be formed by a separate lateral conductor extending from either the inner wall of the outer body toward the center conductor, or from the center conductor toward the inner wall of the outer body.

While the present invention has been described with respect to preferred embodiments thereof, such description is for illustrative purposes only, and is not to be construed as limiting the scope of the invention. Various modifications and changes may be made to the described embodiments by those skilled in the art without departing from the true spirit and scope of the invention as defined by the appended claims.

I claim:

1. A surge-protected coaxial termination comprising in combination:

a. a metallic outer body having a central bore extending therethrough along a longitudinal axis between first and second ends of said metallic outer body, the central bore being bounded by an inner wall having a first portion of a first inner diameter and a first axial length, said inner wall also having a second portion of a second inner diameter and a second axial length, wherein said second axial length is significantly shorter than said first axial length, and wherein said second inner diameter is significantly smaller than said first inner diameter;

b. a center conductor extending into the central bore of said metallic outer body and extending into both the first and second portions of said inner wall, said center conductor having a predetermined outer diameter within the second portion of the central bore, the predetermined outer diameter of said center conductor being slightly less than the second inner diameter of the second portion of said inner wall for positioning said second portion of said inner wall in close proximity to said center conductor to form a spark gap therebetween; and c. air withing the spark gap formed between said second portion of said inner wall and said center conductor.

2. The surge-protected coaxial termination recited by claim 1 wherein said second portion of said inner wall lies adjacent a first zone of relatively high impedance on a first side thereof.

3. A surge-protected coaxial termination comprising in combination:

a. a metallic outer body having a central bore extending therethrough along a longitudinal axis between first and second ends of said metallic outer body, the central bore being bounded by an inner wall having a first portion of a first inner diameter and a first axial length, said inner wall also having a second portion of a second inner diameter and a second axial length wherein said second axial length is significantly shorter than said first axial length, wherein said second inner diameter is significantly smaller than said first inner diameter, wherein said second portion of said inner wall lies adjacent a first zone of relatively high impedance on a first side thereof, and wherein said second portion of said inner wall lies adjacent a second zone of relatively high impedance on a second opposing side thereof;

b. a center conductor extending into the central bore of said metallic outer body and extending into both the first and second portions of said inner wall, said center conductor having a predetermined outer diameter within the second portion of the central bore, the predetermined outer diameter of said center conductor being slightly less than the second inner diameter of the second portion of said inner wall for positioning said second portion of said inner wall in close proximity to said center conductor to form a spark gap therebetween.

4. A surge-protected coaxial termination comprising in combination:

a. a metallic outer body having a central bore extending therethrough along a longitudinal axis between first and second ends of said metallic outer body, the central bore being bounded by an inner wall having a first portion of a first inner diameter and a first axial length, said inner wall also having a second portion of a second inner diameter and a second axial length, wherein said second axial length is significantly shorter than said first axial length, wherein said second inner diameter is significantly smaller than said first inner diameter, wherein the second portion of said inner wall of said metallic outer body forms an inwardly-directed step;

b. a center conductor extending into the central bore of said metallic outer body and extending into both the first and second portions of said inner wall, said center conductor having a predetermined outer diameter within the second portion of the central bore, the predetermined outer diameter of said center conductor being slightly less than the second inner diameter of the second portion of said inner wall for positioning said second portion of said inner wall in close proximity to said center conductor to form a spark gap therebetween, and wherein said center conductor includes an outwardly-directed step directed toward said inwardly-directed step, the outwardly-directed step of said center conductor having said predetermined outer diameter.

5. A surge-protected coaxial termination comprising in combination:

a. a metallic outer body having a central bore extending therethrough along a longitudinal axis between first and second ends of said metallic outer body, the central bore being bounded by an inner wall having a first portion of a first inner diameter and a first axial length, said inner wall also having a second portion of a second inner diameter and a second axial length, wherein said second axial length is significantly shorter than said first axial length, wherein said second inner diameter is significantly smaller than said first inner diameter;

b. a center conductor extending into the central bore of said metallic outer body and extending into both the first and second portions of said inner wall, said center conductor having a predetermined outer diameter within the second portion of the central bore, the predetermined outer diameter of said center conductor being slightly less than the second inner diameter of the second portion of said inner wall for positioning said second portion of said inner wall in close proximity to said center conductor to form a spark gap therebetween; and c. a resistive terminating element coupled between said center conductor and said metallic outer body in parallel with said spark gap.

6. The surge-protected coaxial termination recited by claim 5 further including a DC blocking capacitor coupled in series with said resistive terminating element between said center conductor and said metallic outer body in parallel with said spark gap.

7. The surge-protected coaxial termination recited by claim 6 wherein:

a. said resistive terminating element extends axially within said central bore of said metallic outer body between first and second ends of said resistive terminating element; and b. said DC blocking capacitor extends radially between an end of said resistive terminating element and said metallic outer body.

8. The surge-protected coaxial termination recited by claim 7 wherein said resistive terminating element is a carbon composition resistor.

9. The surge-protected coaxial termination recited by claim 8 wherein said DC blocking capacitor is a chip capacitor.

10. A surge-protected coaxial termination comprising in combination:

a. a metallic outer body having a central bore extending therethrough along a longitudinal axis between first and second ends of said metallic outer body, the central bore being bounded by an inner wall having at least a first portion of a first inner diameter;

b. a center conductor extending into the central bore of said metallic outer body along said longitudinal axis, said center conductor including a first region having a first axial length and a first outer diameter, said center conductor including a second region having a second axial length and a second outer diameter, the second axial length being shorter than the first axial length, and the second outer diameter being greater than the first outer diameter, said second region of said center conductor extending within the first portion of said inner wall, and the second outer diameter being slightly less than the first inner diameter of the first portion of said inner wall for positioning said second region of said center conductor in close proximity to said first portion of said inner wall to form a spark gap therebetween; and c. air within the spark gap formed between said second region of said center conductor and said first portion of said inner wall.

11. The surge-protected coaxial termination recited by claim 10 wherein said second portion of said center conductor lies adjacent a first zone of relatively high impedance on a first side thereof.

12. A surge-protected coaxial termination comprising in combination:

a. a metallic outer body having a central bore extending therethrough along a longitudinal axis between first and second ends of said metallic outer body the central bore being bounded by an inner wall having at least a first portion of a first inner diameter;

b. a center conductor extending into the central bore of said metallic outer body along said longitudinal axis, said center conductor including a first region having a first axial length and a first outer diameter, said center conductor including a second region having a second axial length and a second outer diameter, the second axial length being shorter than the first axial length, and the second outer diameter being greater than the first outer diameter, said second region of said center conductor extending within the first portion of said inner wall, and the second outer diameter being slightly less than the first inner diameter of the first portion of said inner wall for positioning said second region of said center conductor in close proximity to said first portion of said inner wall to form a spark gap therebetween, wherein said second portion of said center conductor lies adjacent a first zone of relatively high impedance on a first side thereof, and wherein said second portion of said center conductor lies adjacent a second zone of relatively high impedance on a second opposing side thereof.

13. A surge-protected coaxial termination comprising in combination:

a. a metallic outer body having a central bore extending therethrough along a longitudinal axis between first and second ends of said metallic outer body, the central bore being bounded by an inner wall having at least a first portion of a first inner diameter;

b. a center conductor extending into the central bore of said metallic outer body along said longitudinal axis, said center conductor including a first region having a first axial length and a first outer diameter, said center conductor including a second region having a second axial length and a second outer diameter, the second axial length being shorter than the first axial length, and the second outer diameter being greater than the first outer diameter, said second region of said center conductor extending within the first portion of said inner wall, and the second outer diameter being slightly less than the first inner diameter of the first portion of said inner wall for positioning said second region of said center conductor in close proximity to said first portion of said inner wall to form a spark gap therebetween; and c. a resistive terminating element coupled between said center conductor and said metallic outer body in parallel with said spark gap.

14. The surge-protected coaxial termination recited by claim 13 further including a DC blocking capacitor coupled in series with said resistive terminating element between said center conductor and said metallic outer body in parallel with said spark gap.

15. The surge-protected coaxial termination recited by claim 14 wherein:

a. said resistive terminating element extends axially within said central bore of said metallic outer body between first and second ends of said resistive terminating element; and b. said DC blocking capacitor extends radially between an end of said resistive terminating element and said metallic outer body.

16. The surge-protected coaxial termination recited by claim 15 wherein said resistive terminating element is a carbon composition resistor.

17. The surge-protected coaxial termination recited by claim 16 wherein said DC blocking capacitor is a chip capacitor.

18. A surge-protected coaxial termination comprising in combination:

a. a metallic outer body having a central passage extending therethrough along a central axis of said metallic outer body between first and second ends thereof said central passage being defined by an inner wall of said metallic outer body, at least a first portion of said inner wall having a first inner diameter;

b. a center conductor extending into the central passage of said metallic outer body, at least a first portion of the center conductor having a first outer diameter, the first portion of said center conductor extending into the first portion of said inner wall;

c. a lateral conductor extending from said center conductor toward the first portion of said inner wall for creating a spark gap between said lateral conductor and said metallic outer body, said lateral conductor being proximate to a first zone of relatively high impedance on a first side of said lateral conductor; and d. air within the spark gap formed between said lateral conductor and said metallic outer body.

19. A surge-protected coaxial termination comprising in combination:

a. a metallic outer body having a central passage extending therethrough along a central axis of said metallic outer body between first and second ends thereof, said central passage being defined by an inner wall of said metallic outer body, at least a first portion of said inner wall having a first inner diameter;

b. a center conductor extending into the central passage of said metallic outer body, at least a first portion of the center conductor having a first outer diameter, the first portion of said center conductor extending into the first portion of said inner wall;

c. a lateral conductor extending from said center conductor toward the first portion of said inner wall for creating a spark gap between said lateral conductor and said metallic outer body, wherein said lateral conductor is proximate to a first zone of relatively high impedance on a first side of said lateral conductor, and wherein said lateral conductor is proximate to a second zone of relatively high impedance on a second opposing side of said lateral conductor.

20. A surge-protected coaxial termination comprising in combination:

a. a metallic outer body having a central passage extending therethrough along a central axis of said metallic outer body between first and second ends thereof, said central passage being defined by an inner wall of said metallic outer body, at least a first portion of said inner wall having a first inner diameter;

b. a center conductor extending into the central passage of said metallic outer body, at least a first portion of the center conductor having a first outer diameter, the first portion of said center conductor extending into the first portion of said inner wall;

c. a lateral conductor extending from said center conductor toward the first portion of said inner wall for creating a spark between said lateral conductor and said metallic outer body; and d. a resistive terminating element coupled between said center conductor and said metallic outer body in parallel with said spark gap.

21. The surge-protected coaxial termination recited by claim 20 further including a DC blocking capacitor coupled in series with said resistive terminating element between said center conductor and said metallic outer body in parallel with said spark gap.

22. The surge-protected coaxial termination recited by claim 21 wherein:

a. said resistive terminating element extends axially within said central bore of said metallic outer body between first and second ends of said resistive terminating element; and b. said DC blocking capacitor extends radially between an end of said resistive terminating element and said metallic outer body.

23. The surge-protected coaxial termination recited by claim 22 wherein said resistive terminating element is a carbon composition resistor.

24. The surge-protected coaxial termination recited by claim 23 wherein said DC blocking capacitor is a chip capacitor.

25. A surge-protected coaxial termination comprising in combination:

a. a metallic outer body having a central passage extending therethrough along a central axis of said metallic outer body between first and second ends thereof, said central passage being defined by an inner wall of said metallic outer body, at least a first portion of said inner wall having a first inner diameter;

b. a center conductor extending into the central passage of said metallic outer body, at least a first portion of the center conductor having a first outer diameter, the first portion of said center conductor extending into the first portion of said inner wall;

c. a lateral conductor extending from said first portion of said inner wall toward the center conductor for creating a spark gap between said lateral conductor and said center conductor, said lateral conductor being proximate to a first zone of relatively high impedance on a first side of said lateral conductor; and d. air within the spark gap formed between said lateral conductor and said center conductor.

26. A surge-protected coaxial termination comprising, in combination:

a. a metallic outer body having a central passage extending therethrough along a central axis of said metallic outer body between first and second ends thereof, said central passage being defined by an inner wall of said metallic outer body at least a first portion of said inner wall having a first inner diameter;

b. a center conductor extending into the central passage of said metallic outer body, at least a first portion of the center conductor having a first outer diameter, the first portion of said center conductor extending into the first portion of said inner wall;

c. a lateral conductor extending from said first portion of said inner wall toward the center conductor for creating a spark gap between said lateral conductor and said center conductor, wherein said lateral conductor is proximate to a first zone of relatively high impedance on a first side of said lateral conductor, wherein said lateral conductor is proximate to a second zone of relatively high impedance on a second opposing side of said lateral conductor.

27. A surge-protected coaxial termination comprising in combination:

a. a metallic outer body having a central passage extending therethrough along a central axis of said metallic outer body between first and second ends thereof said central passage being defined by an inner wall of said metallic outer body, at least a first portion of said inner wall having a first inner diameter;

b. a center conductor extending into the central passage of said metallic outer body, at least a first portion of the center conductor having a first outer diameter, the first portion of said center conductor extending into the first portion of said inner wall;

c. a lateral conductor extending from said first portion of said inner wall toward the center conductor for creating a spark gap between said lateral conductor and said center conductor; and d. a resistive terminating element coupled between said center conductor and said metallic outer body in parallel with said spark gap.

28. The surge-protected coaxial termination recited by claim 27 further including a DC blocking capacitor coupled in series with said resistive terminating element between said center conductor and said metallic outer body in parallel with said spark gap.

29. The surge-protected coaxial termination recited by claim 28 wherein:

a. said resistive terminating element extends axially within said central bore of said metallic outer body between first and second ends of said resistive terminating element; and b. said DC blocking capacitor extends radially between an end of said resistive terminating element and said metallic outer body.

30. The surge-protected coaxial termination recited by claim 29 wherein said resistive terminating element is a carbon composition resistor.

31. The surge-protected coaxial termination recited by claim 30 wherein said DC blocking capacitor is a chip capacitor.

32. A surge-protected coupler for coupling together two coaxial transmission devices, the surge-protected coupler comprising in combination:

a. a metallic outer body having a central bore extending therethrough along a longitudinal axis between first and second ends of said metallic outer body, the central bore being bounded by an inner wall having a first portion of a first inner diameter and a first axial length, said inner wall also having a second portion of a second inner diameter and a second axial length, wherein said second axial length is significantly shorter than said first axial length, and wherein said second inner diameter is significantly smaller than said first inner diameter;

b. a center conductor extending into the central bore of said metallic outer body and extending into both the first and second portions of said inner wall, said center conductor having a predetermined outer diameter within the second portion of the central bore, the predetermined outer diameter of said center conductor being slightly less than the second inner diameter of the second portion of said inner wall for positioning said second portion of said inner wall in close proximity to said center conductor to form a spark gap therebetween; and c. air within the spark gap formed between said second portion of said inner wall and said center conductor.

33. The surge-protected coupler recited by claim 32 wherein said second portion of said inner wall lies adjacent a first zone of relatively high impedance on a first side thereof.

34. A surge-protected coupler for coupling together two coaxial transmission devices, the surge-protected coupler comprising in combination:

a. a metallic outer body having a central bore extending therethrough along a longitudinal axis between first and second ends of said metallic outer body, the central bore being bounded by an inner wall having a first portion of a first inner diameter and a first axial length, said inner wall also having a second portion of a second inner diameter and a second axial length, wherein said second axial length is significantly shorter than said first axial length, and wherein said second inner diameter is significantly smaller than said first inner diameter, wherein sad second portion of said inner wall lies adjacent a first zone of relatively high impedance on a first side thereof, and wherein said second portion of said inner wall lies adjacent a second zone of relatively high impedance on a second opposing side thereof; and b. a center conductor extending into the central bore of said metallic outer body and extending into both the first and second portions of said inner walls said center conductor having a predetermined outer diameter within the second portion of the central bore, the predetermined outer diameter of said center conductor being slightly less than the second inner diameter of the second portion of said inner wall for positioning said second portion of said inner wall in close proximity to said center conductor to form a spark gap therebetween.

35. A surge-protected coupler for coupling together two coaxial transmission devices, the surge-protected coupler comprising in combination:

a. a metallic outer body having a central bore extending therethrough along a longitudinal axis between first and second ends of said metallic outer body, the central bore being bounded by an inner wall having a first portion of a first inner diameter and a first axial length, said inner wall also having a second portion of a second inner diameter and a second axial length, wherein said second axial length is significantly shorter than said first axial length, and wherein said second inner diameter is significantly smaller than said first inner diameter, wherein the second portion of said inner wall of said metallic outer body forms an inwardly-directed step; and b. a center conductor extending into the central bore of said metallic outer body and extending into both the first and second portions of said inner wall, said center conductor having a predetermined outer diameter within the second portion of the central bore, the predetermined outer diameter of said center conductor being slightly less than the second inner diameter of the second portion of said inner wall for positioning said second portion of said inner wall in close proximity to said center conductor to form a spark gap therebetween, and wherein said center conductor includes an outwardly-directed step directed toward said inwardly-directed step, the outwardly-directed step of said center conductor having said predetermined outer diameter.

36. A surge-protected coupler for coupling together two coaxial transmission devices, the surge-protected coupler comprising in combination:

a. a metallic outer body having a central bore extending therethrough along a longitudinal axis between first and second ends of said metallic outer body, the central bore being bounded by an inner wall having a first portion of a first inner diameter and a first axial length, said inner wall also having a second portion of a second inner diameter and a second axial length wherein said second axial lend is significantly shorter than said first axial length, and wherein said second inner diameter is significantly smaller than said first inner diameter, wherein the first end of said metallic outer body includes threads for engaging an end of a first coaxial transmission device, and wherein the second end of said metallic outer body includes threads for engaging an end of a second coaxial transmission device; and b. a center conductor extending into the central bore of said metallic outer body and extending into both the first and second portions of said inner wall, said center conductor having a predetermined outer diameter within the second portion of the central bore, the predetermined outer diameter of said center conductor being slightly less than the second inner diameter of the second portion of said inner wall for positioning said second portion of said inner wall in close proximity to said center conductor to form a spark gay therebetween.

37. A surge-protected coupler for coupling together two coaxial transmission devices, the surge-protected coupler comprising in combination:

a. a metallic outer body having a central bore extending therethrough along a longitudinal axis between first and second ends of said metallic outer body, the central bore being bounded by an inner wall having at least a first portion of a first inner diameter;

b. a center conductor extending into the central bore of said metallic outer body along said longitudinal axis, said center conductor including a first region having a first axial length and a first outer diameter, said center conductor including a second region having a second axial length and a second outer diameter, the second axial length being shorter than the first axial length, and the second outer diameter being greater than the first outer diameter, said second region of said center conductor extending within the first portion of said inner wall, and the second outer diameter being slightly less than the first inner diameter of the first portion of said inner wall for positioning said second region of said center conductor in close proximity to said first portion of said inner wall to form a spark gap therebetween; and c. air within the spark gap formed between said second region of said center conductor and said first portion of said inner wall.

38. The surge-protected coupler recited by claim 37 wherein said second region of said center conductor lies adjacent a first zone of relatively high impedance on a first side thereof.

39. A surge-protected coupler for coupling together two coaxial transmission devices, the surge-protected coupler comprising in combination:

a. a metallic outer body having a central bore extending therethrough along a longitudinal axis between first and second ends of said metallic outer body, the central bore being bounded by an inner wall having at least a first portion of a first inner diameter;

b. a center conductor extending into the central bore of said metallic outer body along said longitudinal axis, said center conductor including a first region having a first axial length and a first outer diameter, said center conductor including a second region having a second axial length and a second outer diameter, the second axial length being shorter than the first axial length, and the second outer diameter being greater than the first outer diameter, said second region of said center conductor extending within the first portion of said inner wall and the second outer diameter being slightly less than the first inner diameter of the first portion of said inner wall for positioning said second region of said center conductor in close proximity to said first portion of said inner wall to form a spark gap therebetween, wherein said second region of said center conductor lies adjacent a first zone of relatively high impedance on a first side thereof, and wherein said second region of said center conductor lies adjacent a second zone of relatively high impedance on a second opposing side thereof.

40. A surge-protected coupler for coupling together two coaxial transmission devices, the surge-protected coupler comprising in combination:

a. a metallic outer body having a central bore extending therethrough along a longitudinal axis between first and second ends of said metallic outer body, the central bore being bounded by an inner wall having at least a first portion of a first inner diameter;

b. a center conductor extending into the central bore of said metallic outer body along said longitudinal axis, said center conductor including a first region having a first axial length and a first outer diameter said center conductor including a second region having a second axial length and a second outer diameter, the second axial length being shorter than the first axial length, and the second outer diameter being greater than the first outer diameter, said second region of said center conductor extending within the first portion of said inner wall, and the second outer diameter being slightly less than the first inner diameter of the first portion of said inner wall for positioning said second region of said center conductor in close proximity to said first portion of said inner wall to form a spark gap therebetween; and c. wherein the second region of said center conductor forms an outwardly-directed step, and wherein the first portion said inner wall of said metallic outer body includes an inwardly-directed step directed toward said outwardly-directed step, the inwardly-directed step of the first portion of said inner wall having said first inner diameter.

41. A surge-protected coupler for coupling together two coaxial transmission devices, the surge-protected coupler comprising in combination:

a. a metallic outer body having a central bore extending therethrough along a longitudinal axis between first and second ends of said metallic outer body, the central bore being bounded by an inner wall having at least a first portion of a first inner diameter, wherein the first end of said metallic outer body includes threads for engaging an end of a first coaxial transmission device, and wherein the second end of said metallic outer body includes threads for engaging an end of a second coaxial transmission device;

b. a center conductor extending into the central bore of said metallic outer bode along said longitudinal axis, said center conductor including a first region having a first axial length and a first outer diameter, said center conductor including a second region having a second axial length and a second outer diameter, the second axial length begin shorter than the first axial length, and the second outer diameter being greater than the first outer diameter, said second region of said center conductor extending within the first portion of said inner wall, and the second outer diameter being slightly less than the first inner diameter of the first portion of said inner wall for positioning said second region of said center conductor in close proximity to said first portion of said inner wall to form a spark gap therebetween.

* * * * *

UNITED STATES PATENT AND TRADEMARK OFFICE

CERTIFICATE OF CORRECTION

PATENT NO. : 6,751,081 B1
DATED : June 15, 2004
INVENTOR(S) : John A. Kooiman et al.

It is certified that error appears in the above-identified patent and that said Letters Patent is hereby corrected as shown below:

Column 13,
Line 46, "creating a spark between said lateral conductor and said" should be
-- creating a spark gap between said lateral conductor and said --

Column 15,
Line 65, "diameter, wherein said second portion of said inner wall" should be
-- diameter, wherein said second portion of said inner wall --

Column 16,
Line 7, "first and second portions of said innser walls said center" should be
-- first and second portions of said inner wall, said center --
Line 55, "second axial lend is significantly shorter than said first" should be
-- second axial length is significantly shorter than said first --

Column 17,
Line 6, "said center conductor to form a spark gay therebetween" should be
-- said center conductor to form a spark gap therebetween --

Column 18,
Line 46, "said metallic outer bode along said longitudinal axis," should be
-- said metallic outer body along said longitudinal axis, --

Signed and Sealed this

Seventh Day of September, 2004

JON W. DUDAS
*Director of the United States Patent and Trademark Office*